United States Patent
Agarwal et al.

(10) Patent No.: US 12,026,379 B2
(45) Date of Patent: Jul. 2, 2024

(54) DATA STORAGE DEVICE AND METHOD FOR HOST-INITIATED TRANSACTIONAL HANDLING FOR LARGE DATA SET ATOMICITY ACROSS MULTIPLE MEMORY COMMANDS

(71) Applicant: Western Digital Technologies, Inc., San Jose, CA (US)

(72) Inventors: Dinesh Kumar Agarwal, Bangalore (IN); Amit Sharma, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/693,877

(22) Filed: Mar. 14, 2022

(65) Prior Publication Data

US 2023/0289075 A1    Sep. 14, 2023

(51) Int. Cl.
*G06F 12/00* (2006.01)
*G06F 3/06* (2006.01)
*G06F 9/46* (2006.01)
*G06F 13/00* (2006.01)

(52) U.S. Cl.
CPC .......... *G06F 3/0631* (2013.01); *G06F 3/0604* (2013.01); *G06F 3/0659* (2013.01); *G06F 3/0683* (2013.01); *G06F 9/466* (2013.01)

(58) Field of Classification Search
CPC .... G06F 3/0631; G06F 3/0604; G06F 3/0659; G06F 3/0683; G06F 9/466
USPC ......................................................... 711/154
See application file for complete search history.

(56) References Cited

U.S. PATENT DOCUMENTS

| | | | | |
|---|---|---|---|---|
| 5,625,819 | A * | 4/1997 | Hoffer, Jr. ........... | G06F 11/1441 |
| 8,549,249 | B1 * | 10/2013 | Metcalf .................... | H04L 47/83 |
| | | | | 711/166 |
| 9,251,062 | B2 * | 2/2016 | Flynn .................... | G06F 3/0652 |
| 9,323,465 | B2 * | 4/2016 | Flynn .................... | G11C 16/06 |
| 9,910,777 | B2 * | 3/2018 | Flynn .................... | G06F 3/0643 |
| 10,019,320 | B2 * | 7/2018 | Talagala .............. | G06F 11/1443 |
| 10,133,662 | B2 * | 11/2018 | Peterson ............... | G06F 3/0608 |
| 10,956,324 | B1 * | 3/2021 | Giles ...................... | G06F 12/128 |
| 2008/0301256 | A1 * | 12/2008 | McWilliams ....... | G06F 12/0806 |
| | | | | 714/E11.178 |
| 2012/0079245 | A1 * | 3/2012 | Wang .................... | G06F 9/3842 |
| | | | | 712/228 |
| 2012/0079246 | A1 * | 3/2012 | Breternitz, Jr. ......... | G06F 8/443 |
| | | | | 712/228 |

(Continued)

*Primary Examiner* — Sheng Jen Tsai
(74) *Attorney, Agent, or Firm* — Crowell & Moring LLP (57) ABSTRACT

A data storage device and method for host-initiated transactional handling for large data set atomicity across multiple memory commands are provided. In one embodiment, a data storage device is provided comprising a memory and a controller. The controller is configured to commence performance of a plurality of atomic operations; and prior to successful completion of the plurality of atomic operations: determine an available capacity of the memory, wherein memory locations storing data written by the plurality of atomic operations are considered unavailable even though the data is not yet committed to the memory locations; and inform the host of the determined available capacity of the memory. Other embodiments are possible, and each of the embodiments can be used alone or together in combination.

20 Claims, 9 Drawing Sheets

(56) References Cited

U.S. PATENT DOCUMENTS

| | | | |
|---|---|---|---|
| 2014/0006685 A1* | 1/2014 | Peterson | G06F 12/0238 711/102 |
| 2014/0189216 A1* | 7/2014 | Flynn | G06F 11/108 711/103 |
| 2015/0032970 A1* | 1/2015 | Francis | G06F 12/12 711/141 |
| 2015/0113223 A1* | 4/2015 | Brown | G06F 12/0893 711/133 |
| 2018/0089099 A1* | 3/2018 | Raj | G06F 12/10 |
| 2018/0275916 A1* | 9/2018 | Marinescu | G06F 3/0658 |
| 2019/0079827 A1* | 3/2019 | Nguyen | H03M 13/2906 |
| 2019/0155753 A1* | 5/2019 | Zhu | G06F 21/10 |
| 2020/0356307 A1* | 11/2020 | Subbarao | G06F 12/0246 |
| 2020/0356484 A1* | 11/2020 | Subbarao | G11C 11/413 |
| 2020/0371700 A1* | 11/2020 | Stabrawa | G06F 3/0631 |
| 2020/0409855 A1* | 12/2020 | Subbarao | G06F 12/0811 |
| 2021/0141726 A1* | 5/2021 | Robinson | G06F 12/0837 |
| 2021/0240616 A1* | 8/2021 | Stabrawa | G06F 12/0804 |
| 2021/0286752 A1* | 9/2021 | Modukuri | G06F 13/4022 |
| 2022/0413994 A1* | 12/2022 | Wiegert | G06F 9/30101 |
| 2023/0008874 A1* | 1/2023 | Stabrawa | G06F 9/45558 |

* cited by examiner

DATA STORAGE DEVICE AND METHOD FOR HOST-INITIATED TRANSACTIONAL HANDLING FOR LARGE DATA SET ATOMICITY ACROSS MULTIPLE MEMORY COMMANDS

BACKGROUND

A data storage device can be used to store data sent from a host. In some situations, the data storage device is asked to perform a plurality of atomic operations, where data written by each operation is committed and accessible by the host only if all of the atomic operations are successfully performed. If even one of the operations fails, the data written by the successful operations is removed ("rolled back").

DETAILED DESCRIPTION

Overview

By way of introduction, the below embodiments relate to a data storage device and method for host-initiated transactional handling for large data set atomicity across multiple memory commands. In one embodiment, a data storage device is provided comprising a memory and a controller. The controller is configured to commence performance of a plurality of atomic operations; and prior to successful completion of the plurality of atomic operations: determine an available capacity of the memory, wherein memory locations storing data written by the plurality of atomic operations are considered unavailable even though the data is not yet committed to the memory locations; and inform the host of the determined available capacity of the memory.

In some embodiments, the controller is further configured to perform at least one write operation requested by the host in parallel with the performance of the plurality of atomic operations.

In some embodiments, the controller is further configured to inform the host of the determined available capacity of the memory in response to a request from the host.

In some embodiments, the controller is further configured to maintain states of the plurality of atomic operations.

In some embodiments, the controller is further configured to perform the plurality of atomic operations in parallel with the host performing a power cycle.

In some embodiments, the controller is further configured to commit the data to the memory locations after successful completion of the plurality of atomic operations.

In some embodiments, the controller is further configured to delete a reference to the data after unsuccessful completion of the plurality of atomic operations.

In some embodiments, the controller is further configured to delete the data after unsuccessful completion of the plurality of atomic operations.

In some embodiments, the data is written across multiple blocks in the memory.

In some embodiments, the memory comprises a three-dimensional memory.

In another embodiment, a method is provided that is performed in a data storage device during performance of an atomic transaction. The method comprises: writing data from the atomic transaction in blocks in a memory of the data storage device; writing partial commit references that associate the data with the blocks; providing the host with an indication of an amount of memory available for the host to write to in parallel with the atomic transaction, wherein the blocks associated with partial commit references are deemed unavailable.

In some embodiments, the method further comprises responding to an inquiry from the host regarding whether the data storage device is configured to perform the atomic transaction.

In some embodiments, the method further comprises responding to a request from the host for a status check of the atomic transaction.

In some embodiments, the host is provided with the indication of the amount of memory available in response to a request from the host.

In some embodiments, the method further comprises removing the partial commit references after successful completion of the atomic transaction.

In some embodiments, the method further comprises maintaining states of the atomic transaction.

In some embodiments, the method further comprises performing a part of the atomic transaction during a host power cycle.

In some embodiments, the method further comprises rolling back the data written from the atomic transaction in response to an unsuccessful completion of the atomic transaction.

In some embodiments, the data is written across multiple blocks in the memory.

In another embodiment, a data storage device is provided comprising: a memory; means for commencing performance of a plurality of atomic operations; and means for informing a host of an available capacity of the memory prior to successful completion of the plurality of atomic operations, wherein memory locations storing data written by the plurality of atomic operations are considered unavailable.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
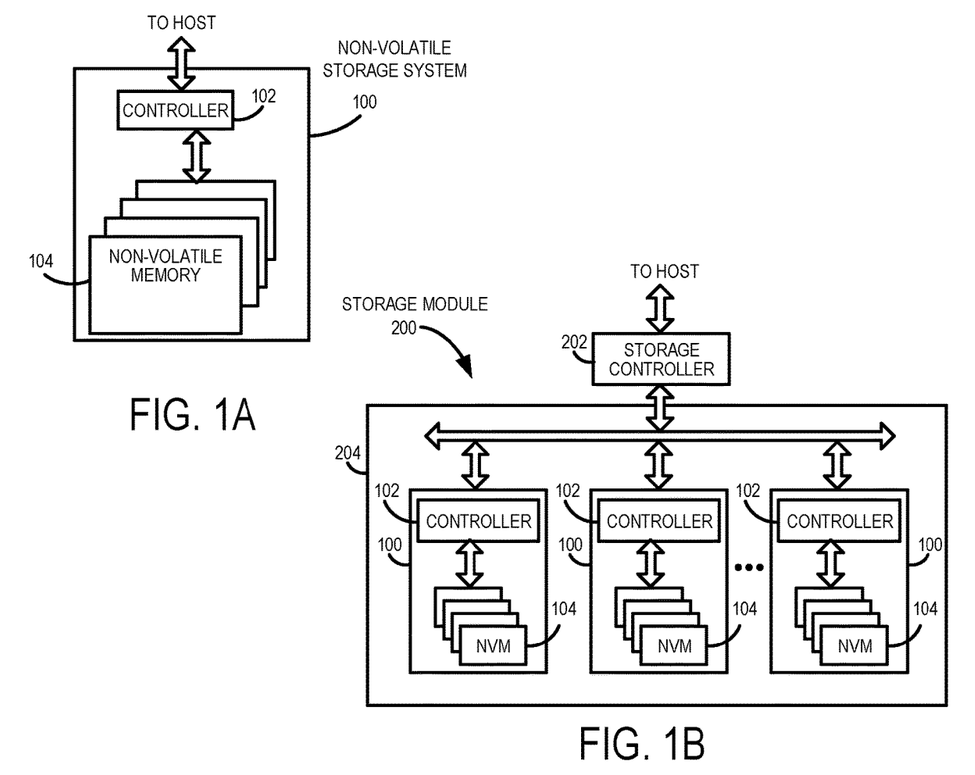
FIG. 1A is a block diagram of a data storage device of an embodiment.
FIG. 1B is a block diagram illustrating a storage module of an embodiment.
Figure 1C:
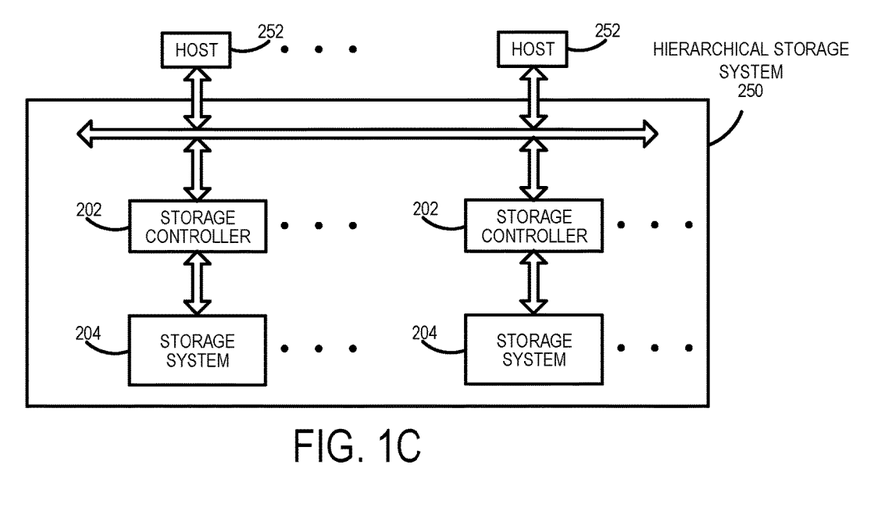
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
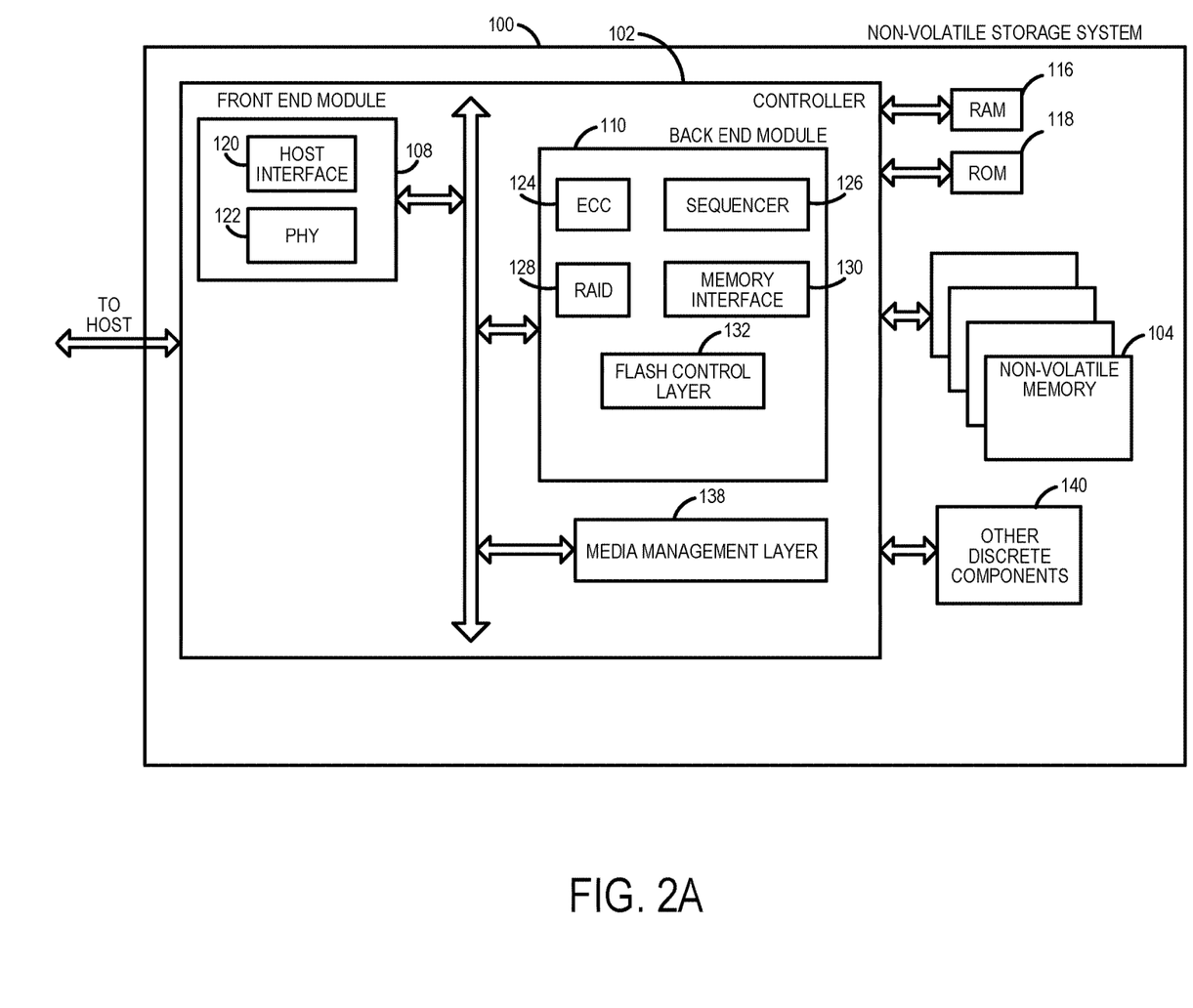
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
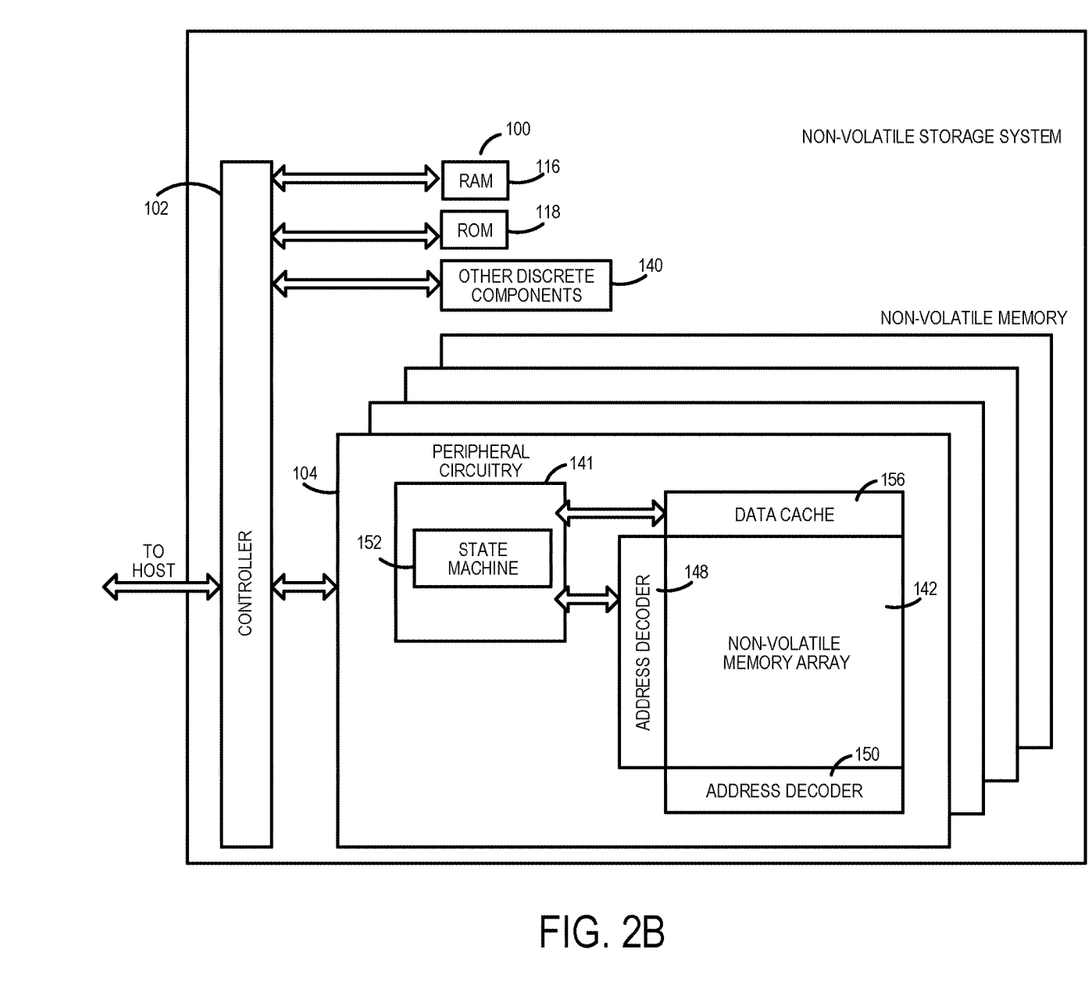
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
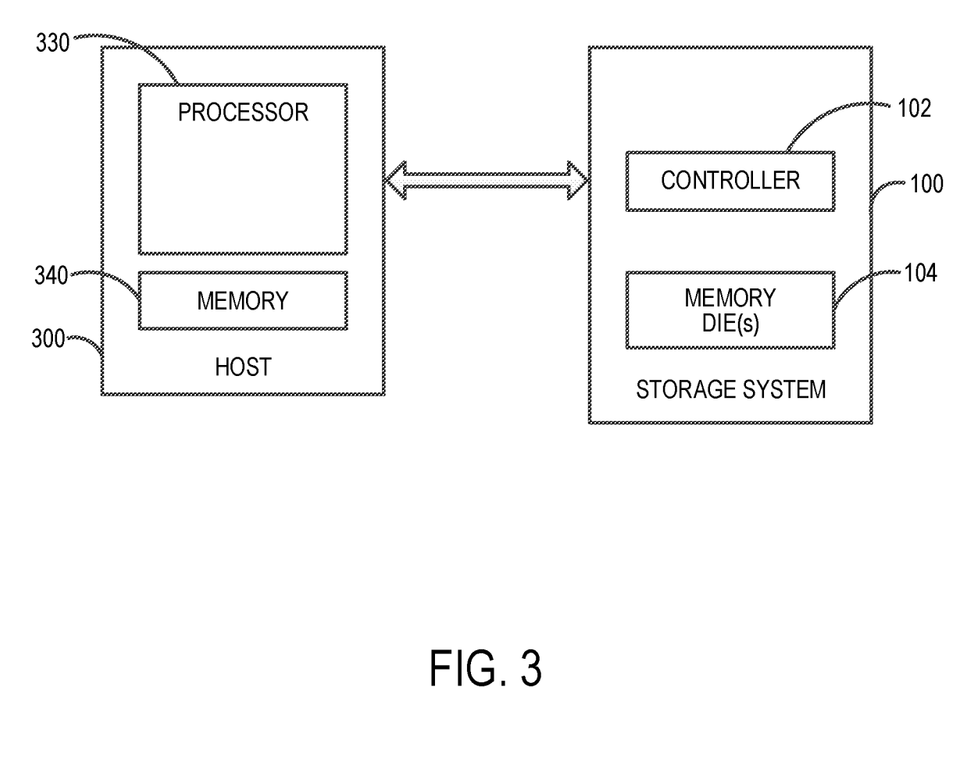
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

The host 300 can send read and write operations to the data storage device 100 for execution in the memory 104. In some situations, the host 300 sends a plurality of atomic operations (an "atomic transaction") to the data storage device 100 for execution. An atomic transaction is an indivisible and irreducible series of operations, such that either all operations occurs or none of the operations occurs. A guarantee of atomicity prevents updates occurring only partially, which can cause greater problems than rejecting the whole series outright. Atomic operations can be useful in several host applications, including, but not limited to, database transactions and other use cases where write transactions are performed in steps but useful when all the previous transaction have also gone through.

Figure 4A:
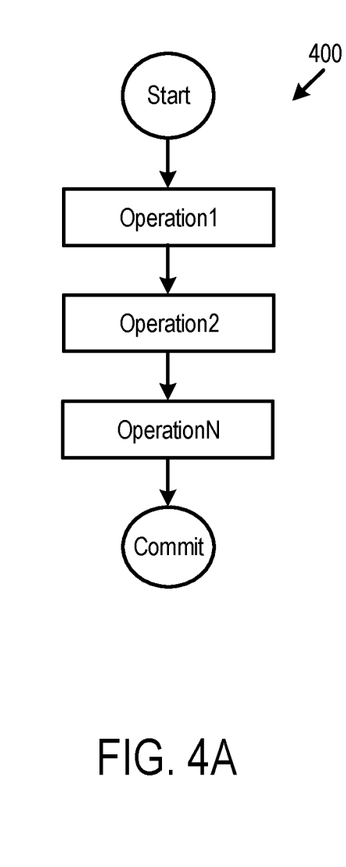
FIG. 4A is a flow chart that illustrates steps of an embodiment that are performed when a plurality of atomic operations are successfully completed.
Figure 4B:
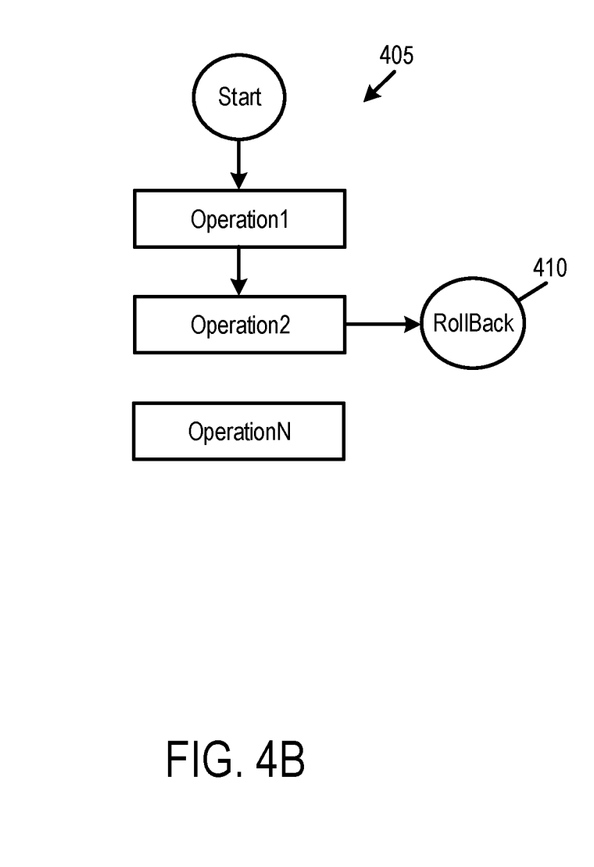
FIG. 4B is a flow chart that illustrates steps of an embodiment that are performed when a plurality of atomic operations are not successfully completed.

FIGS. 4A and 4B are flow charts 400, 405 that illustrates successful and unsuccessful atomic operations, respectively. In these examples, Operation1, Operation2, and OperationN are atomic operations. As shown in FIG. 4A, if all of these operations are successfully performed, the data written by these operations is committed to memory. However, as shown in FIG. 4B, if Operation2 is not successfully, the data written by Operation1 and Operation2 is rolled back (act 410), and OperationN is not performed. Rolling back the data ensures that partial data is not written, which avoids unpredictable host/application behavior or wrong data.

The following embodiments can be used to perform a plurality of atomic operations optimally with host-device coordinated efforts and minimal latencies for such operations. The host 300 can initiate such transactions and intimate to the data storage device 100 about the start and commit operations, and the data storage device 100 can take care of internal states and the rollback (if required) and provide fast access to data. In one embodiment, large data atomic operations spanning across multiple commands are performed, with the transaction state for each command being maintained. Since the data storage device 100 operates on large data, the capacity of the memory 104 can be updated (even though the data is not fully committed and accessible by the host 300), and the partially-committed data amount can be checked by the host 300 (e.g., by sending a specific command to the data storage device 100).

In general, in at least some of these embodiments, the host 300 can initiate atomic operations with multiple transactions with start operation that can span across multiple commands and contain large data, which is committed after all the steps are done. The host 300 can shift to other operations before committing the large data transactions. The data storage device 100 can maintain partially-committed data information/available capacity in the memory 104 at any point in time and provision for discard. The data storage device 100 can also maintain the internal state of the operations (e.g., partial/aborted/fully-committed). The host 300 and/or the data storage device 100 can initiate rollback, and atomicity can be maintain by coordination between the host 300 and the data storage device 100.

The following paragraphs present an example embodiment. It should be understood that this is merely an example, and other implementations can be used. So, the details presented herein should not be read into the claims unless expressly recited therein.

Figure 5:
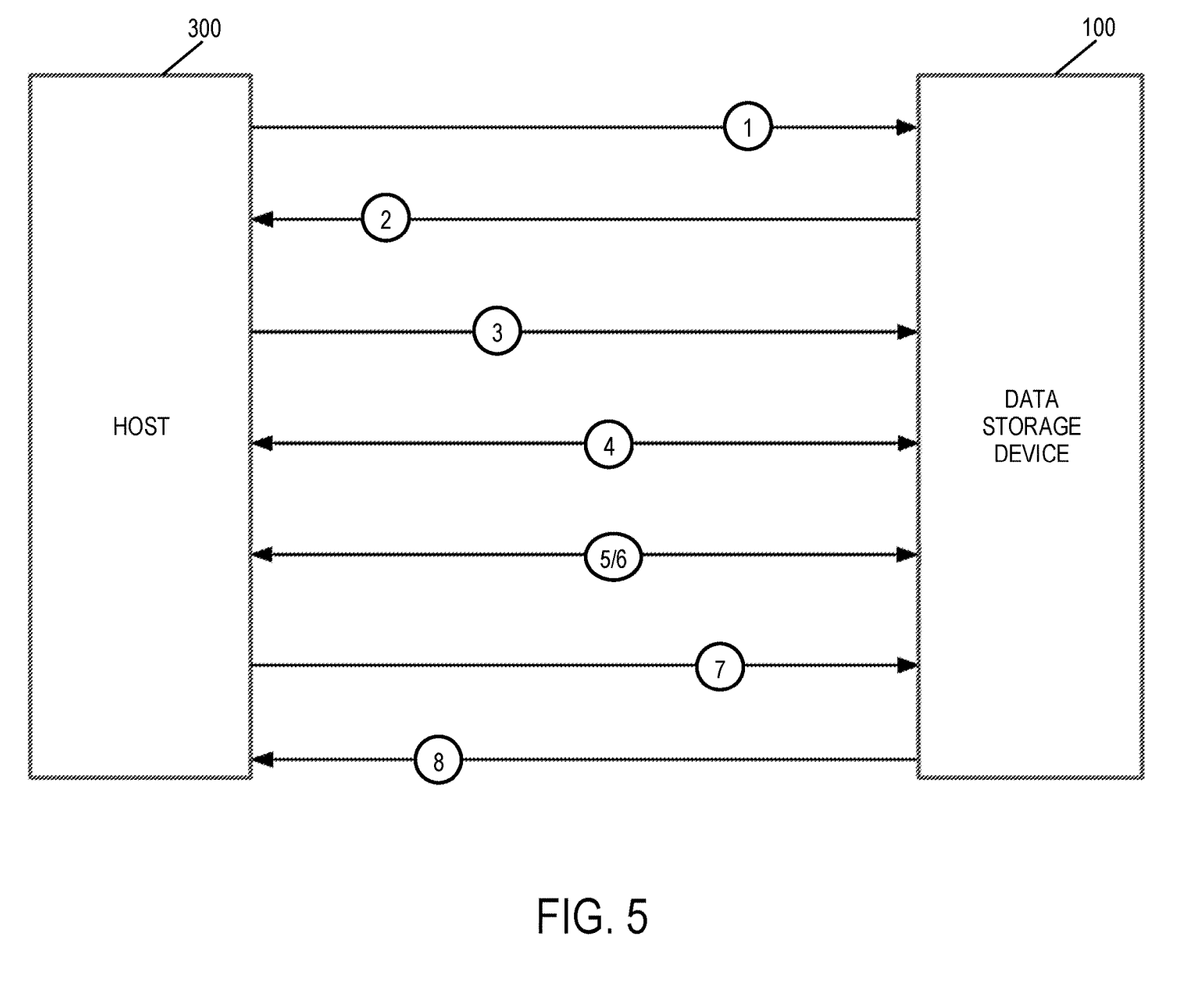
FIG. 5 is a block diagram of a host and data storage device of an embodiment.

Turning again to the drawings, FIG. 5 illustrates the interactions of the host 300 and the data storage device 100 of an embodiment. As shown in FIG. 5, the host 300 sends a command to the data storage device 100 to check to see if the data storage device 100 supports atomic transactions (act 1). The data storage device 100 then responds to the host 300 by informing the host 300 that it supports atomic transactions (act 2). The host 300 then creates an atomic transaction by sending a plurality of atomic operations to the data storage device 100 (act 3). The host 300 can send a status check to the data storage device 100, which, in response, can inform the host 300 of the status of the atomic operations (e.g., partially committed/failed/aborted) (act 4).

As will be discussed in more detail below, when the data storage device 100 begins execution of the plurality of atomic operations, data is written to the memory 104. However, the data is not "committed" until all of the plurality of atomic operations are successfully performed. Data that is not committed is still stored in the memory 104 and takes up space in the memory 104, but the data is not accessible (or even visible) to the host 300. For example, a logical-to-physical address entry for a logical address of the data will point to physical address in the memory 104 where the data is stored, but, when the host 300 attempts to read the logical address before the data is committed, the data is not returned. Instead, default dummy data can be returned (e.g., as pointed to be an alternate mapping that is used until the data is committed).

In this embodiment, when the atomic operations involve large data sets, the atomic operations can take a relatively-long time to perform. So, in this embodiment, the host 300 can send other commands (read and/or write commands) to the data storage device 100 for execution in parallel with the execution of the plurality of atomic operations (act 5). However, until the data written by the atomic operations is committed, the host 300 is not aware that the data is stored in the memory 104. So, from the host's perspective, the available capacity of the memory 104 is greater than the actual available capacity of the memory 104. That is, even though the data is not committed to the memory 104, it is stored in the memory 104 and cannot be overwritten with other data. This can create a problem if the host 300 attempts to write more data to the memory 104 that the actual available capacity of the memory 104.

To address this problem, in this embodiment, prior to the successful completion of the atomic operations, the controller 102 of the data storage device 100 determines and reports back to the host 300 what the available capacity of the memory 104 is assuming that the atomic operations will be successfully completed and the data fully committed to the memory (act 6). This way, the host 300 will be prevented from writing more data to the memory 104 than the memory 104 actually has capacity for. Of course, it is possible that the atomic operations will not be successfully completed, in which case the data will not be fully committed to the memory and there will be more available capacity of the memory 104 than reported to the host 300. However, because this is not known at the time of reporting to the host 300, the data storage device 100 assumes that the atomic operations will be successfully completed.

The actual available capacity of the memory 104 can be calculated in any suitable way. For example, control data (e.g., entries in a logical-to-physical address table) stored in any suitable location in the data storage device 100 can associate the logical address of data written by an atomic operation to a physical location in the memory 104 that stores the data. Prior to the data being committed, the control data can contain a flag or alternate address (a partial commit reference) that indicates that the data is not committed, so the associated physical address where the data is actually stored is not used. Available capacity can be determined from information in the control data, which can show how many blocks of memory 104 are being used. Entries with a partial commit reference are typically not counted as part of the used memory 104. So, in this embodiment, the controller 102 can count blocks with partial commit references as being used, so the available capacity reported to the host 300 would be more accurate.

If the atomic operations are successfully completed, the data is committed (act 7), and the data storage device 100 can return valid, committed data written by any of the write operations in the atomic transaction (act 8).

In summary, in this example, the host 300 can check if the data storage device 100 supports atomic operations, and, if the support is available, the atomic transactions are initiated. The host 300 can keep performing intermediate operations, and the data storage device 100 can maintain the state of those operations. The host 300 can check the state at any point of time, and the operations can be rolled back by the host 300 or the data storage device 100 in case of any failure or when the host 300 wants to roll back the operation steps. If the host 300 is fine with all the steps performed, then it commits the atomic operations and checks the status. After that, the data storage device 100 can commit the operation and return the latest data. As mentioned above, the operations can span across multiple commands (e.g., NVMe commands), and the host 300 can shift to other operations while in the middle of atomic transactions. The size of the transaction dataset can be relatively large and can be maintained in blocks in the memory 104, and information can be provided about the partially-committed data for capacity adjustments.

Figure 6:
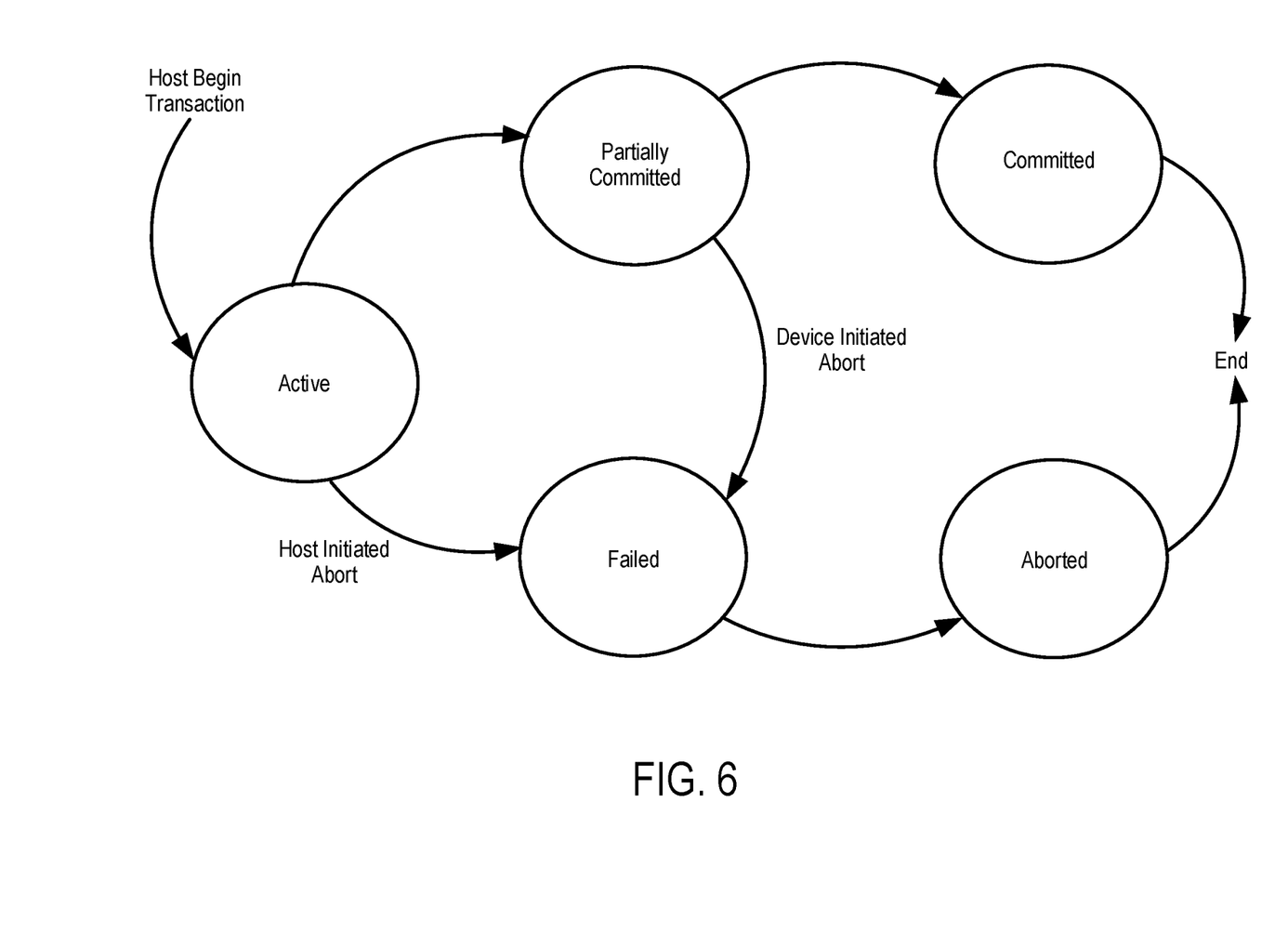
FIG. 6 is a state diagram of an embodiment.

In performing the atomic operations, the controller 102 of the data storage device 100 can maintain various states for the atomic operation and various states that it can take. FIG. 6 is a diagram that illustrates example of various paths that can be taken and how the operation state can change based on host commands or internal handling by the data storage device 100. If the transaction fails, it can be aborted by the host 300. In the case of an internal failure in the data storage device 100, the transaction can be automatically aborted, and the host 300 can be notified of such when it checks the status. When all operations are successful, the host 300 can commit the operations.

As mentioned above, to perform the atomic operations, the controller 102 of the data storage device 100 can create partial references for the atomic operations, and all the commits can be referred to using partial references, which are committed only when the host 300 performs the final commit operation. When the commits are pointing to a partially-committed region, these can be translated using partially-committed references, so the host 300 cannot access the data, and the state is shown as partially committed. Access to data during this phase remains unavailable. When the host 300 commits the atomic operation, the partial references are removed, all the data is committed, and the reference is changed, so the data is accessible by the host 300.

Figure 7:
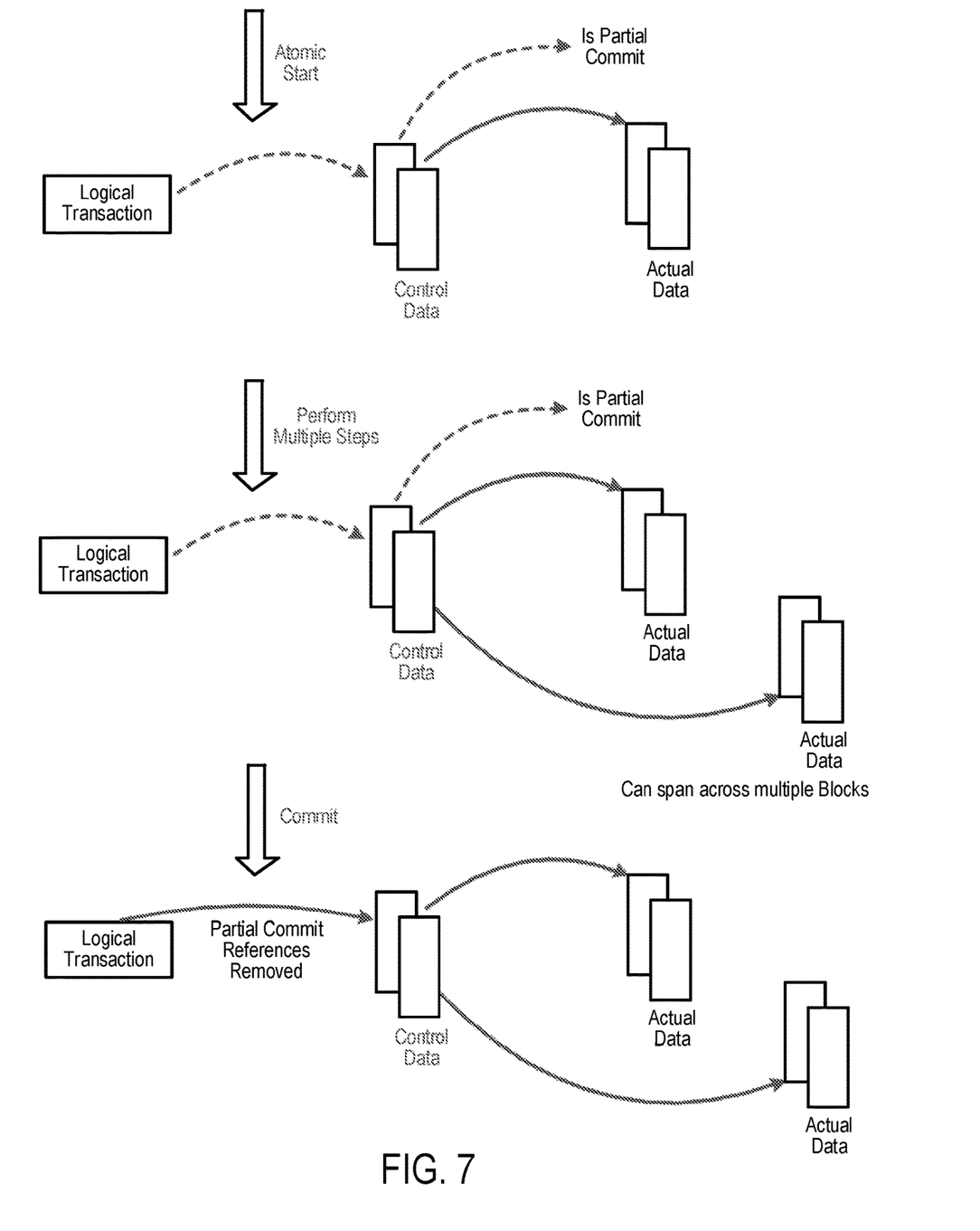
FIG. 7 is a diagram that shows actions that are performed when a plurality of atomic operations are successfully completed.

FIG. 7 is a diagram that shows actions that are performed when a plurality of atomic operations are successfully completed. As shown in the top drawing in FIG. 7, when data from atomic operations are written in the memory 104, control data (e.g., entries in a logical-to-physical address table) associates a logical address of the data with the physical address of the location in the memory 104 where the data is stored. As shown in the middle diagram in FIG. 7, the data from atomic operations can span across multiple blocks in the memory 104.

The data written by the atomic operations is not "committed" until successful completion of the atomic operations. So, as shown in the top and middle drawings in FIG. 7, before that occurs, if the host 300 requests that the logical address be written or read (shown as "logical transaction" in FIG. 7), the controller 102 of the data storage device 100 does not execute that transaction to read the data. For example, if the host 300 attempts to read data that is not yet committed, the controller 102 does not read the data from the associated physical address. Instead, it can return default dummy data, which can be stored at another physical address (e.g., as pointed to by "partial commit references" in the control data). Alternatively, the controller 102 can be configured to only consult the control data for logical addresses that have been committed. Other implementations can be used. As shown in the bottom drawing in FIG. 7, when the atomic operations are successfully completed, the partial commit references are removed from the control data. That way, when the host 300 sends a read command for the logical address, the controller 102 uses the actual associated physical address in the control data to read the data and return it to the host 300.

Figure 8:
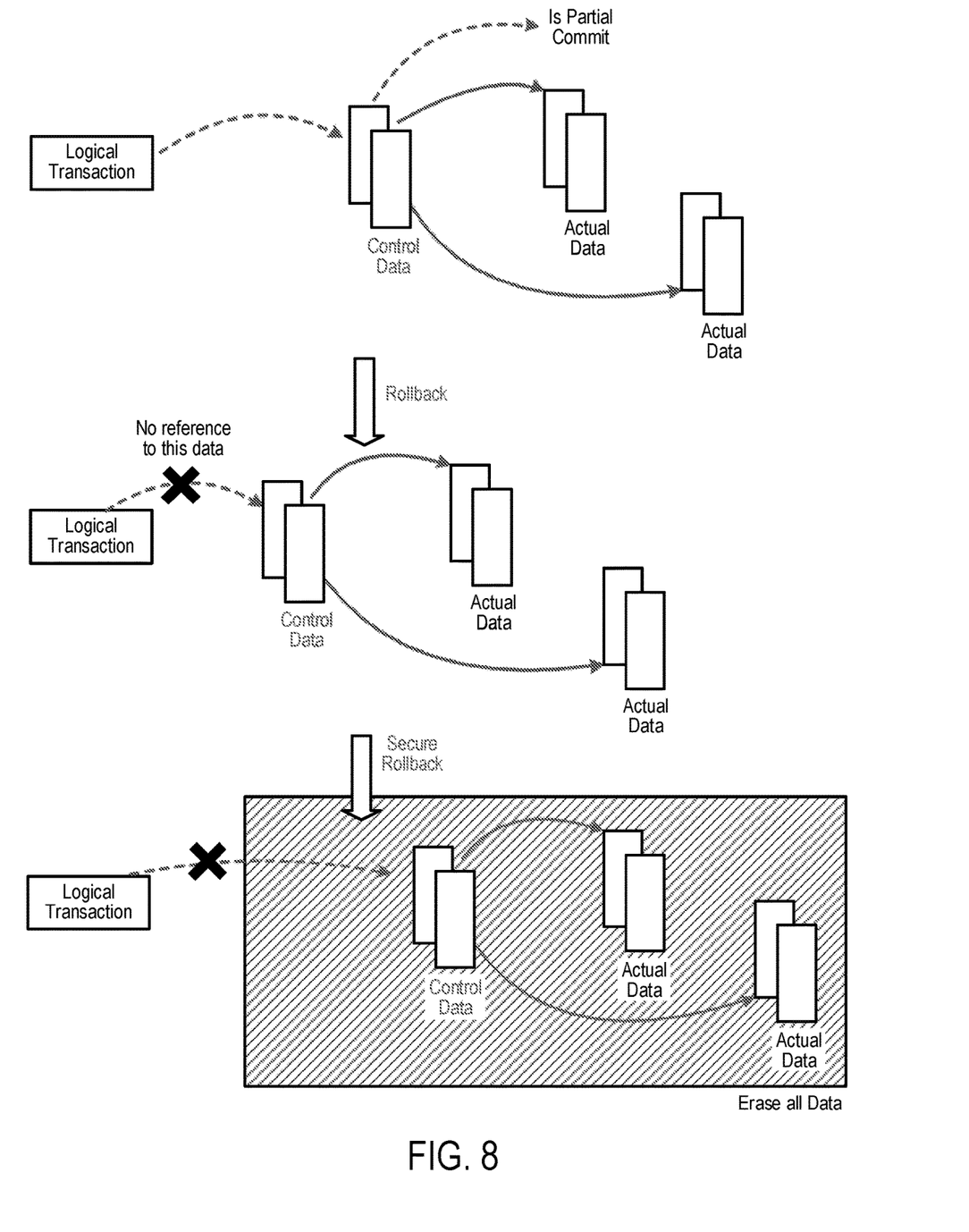
FIG. 8 is a diagram that shows actions that are performed when a plurality of atomic operations are not successfully completed.

FIG. 8 is a diagram that shows actions that are performed when a plurality of atomic operations are not successfully completed. The top drawing is similar to the one shown in FIG. 7. However, in this scenario, one or more of the atomic operations are not successful completed. As a result, the controller 102 "rolls back" the data that was written to the memory 104 by removing any reference to it in the control data (middle drawing in FIG. 8) and deleting the data from the memory 104 (bottom drawing in FIG. 8). Thus, the references to all the intermediate regions/control regions and data is discarded, and erasing the data allows the rollback to be performed in a secure fashion.

Using these embodiments can ensure that atomic operations containing large data sets and spanning across multiple commands are performed in an optimal fashion, while minimizing latencies. With these embodiments, atomic operations can be performed seamlessly by just using the memory 104 of the data storage device 100 (i.e., multiple operations at the host-device bus are not required for data update/fetching). These embodiments allow large atomic operations to be easily performed, as the data storage device 100 is used for storing the data. Capacity display with partial commits and rollback also keep changing and are maintained by host-device synchronization.

There are several advantages associated with these embodiments. For example, these embodiments can be used to provide optimal handling for host atomic operations, efficient memory operations that can handle large atomic operation using the data storage device's memory 104, reduced traffic at the data storage device 100 for performing atomic operation compared to being performed independently by the host 300, and support for secure atomic transactions compared to when data is fetched by the host 300 for rollbacks Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
      in response to receiving, from a host, a request to perform a plurality of atomic operations, commence performance of the plurality of atomic operations by:
         storing data in physical addresses in the memory; and
         including partial commit references in entries in a logical-to-physical address map for the physical addresses;
      in response to receiving, from the host, a request for an available capacity of the memory prior to successful completion of the plurality of atomic operations:
         determine an available capacity of the memory, wherein the physical addresses associated with the entries in the logical-to-physical address map that include the partial commit references are considered unavailable even though the data is not yet committed to the physical addresses; and inform the host of the determined available capacity of the memory;

in response to receiving, from the host, a request to perform other, non-atomic operations in the memory, perform the other, non-atomic operations in the memory in parallel with the plurality of atomic operations wherein the other, non-atomic operations are selected by the host so as to not exceed the determined available capacity of the memory; and in response to determining that an atomic operation of the plurality of atomic operations failed or was aborted by the host:

delete the partial commit reference in the entry in the logical-to-physical address map for the physical address associated with the atomic operation; and determine an updated available capacity of the memory, wherein the physical address associated with the atomic operation is considered available after the partial commit reference in the entry in the logical-to-physical address map for the physical address is deleted.

2. The data storage device of claim 1, wherein the controller is further configured to:
in response to receiving, from the host, a command to read a memory location associated with one of the entries in the logical-to-physical address map that includes the partial commit reference:
return default dummy data.

3. The data storage device of claim 1, wherein the controller is further configured to maintain states of the plurality of atomic operations.

4. The data storage device of claim 1, wherein the controller is further configured to perform the plurality of atomic operations in parallel with the host performing a power cycle.

5. The data storage device of claim 1, wherein the controller is further configured to commit the data to the physical addresses after successful completion of the plurality of atomic operations.

6. The data storage device of claim 1, wherein the controller is further configured to delete a reference to the data after unsuccessful completion of the plurality of atomic operations.

7. The data storage device of claim 1, wherein the controller is further configured to delete the data after unsuccessful completion of the plurality of atomic operations.

8. The data storage device of claim 1, wherein the data is stored across multiple blocks in the memory.

9. The data storage device of claim 1, wherein the memory comprises a three-dimensional memory.

10. A method comprising:
performing the following in a data storage device comprising a memory:
in response to receiving, from a host, a request to perform a plurality of atomic operations, commencing performance of the plurality of atomic operations by:
storing data in physical addresses in the memory; and
including partial commit references in entries in a logical-to-physical address map for the physical addresses;

in response to receiving, from the host, a request for an available capacity of the memory prior to successful completion of the plurality of atomic operations:

determining an available capacity of the memory, wherein the physical addresses associated with the entries in the logical-to-physical address map that include the partial commit references are considered unavailable even though the data is not yet committed to the physical addresses; and informing the host of the determined available capacity of the memory;

in response to receiving, from the host, a request to perform other, non-atomic operations in the memory, performing the other, non-atomic operations in the memory in parallel with the plurality of atomic operations, wherein the other, non-atomic operations are selected by the host so as to not exceed the determined available capacity of the memory; and in response to determining that an atomic operation of the plurality of atomic operations failed or was aborted by the host:

deleting the partial commit reference in the entry in the logical-to-physical address map for the physical address associated with the atomic operation; and determining an updated available capacity of the memory, wherein the physical address associated with the atomic operation is considered available after the partial commit reference in the entry in the logical-to-physical address map for the physical address is deleted.

11. The method of claim 10, further comprising:
in response to receiving, from the host, a command to read a memory location associated with one of the entries in the logical-to-physical address map that includes the partial commit reference:
returning default dummy data.

12. The method of claim 10, further comprising responding to a request from the host for a status check of the plurality of atomic operations.

13. The method of claim 10, further comprising removing the partial commit references after successful completion of the plurality of atomic operations.

14. The method of claim 10, further comprising maintaining states of the plurality of atomic operations.

15. The method of claim 10, further comprising performing a part of the plurality of atomic operations during a host power cycle.

16. The method of claim 10, further comprising rolling back the data written from the plurality of atomic operations in response to an unsuccessful completion of the atomic plurality of atomic operations.

17. The method of claim 10, wherein the data is stored across multiple blocks in the memory.

18. A data storage device comprising:
a memory;
means for, in response to receiving a request from a host to perform a plurality of atomic operations, commencing performance of the plurality of atomic operations by:
storing data in physical addresses in the memory; and
including partial commit references in entries in a logical-to-physical address map for the physical addresses;

means for, in response to receiving a request from the host for an available capacity of the memory prior to successful completion of the plurality of atomic operations:
- determining an available capacity of the memory, wherein the physical addresses associated with the entries in the logical-to-physical address map that include the partial commit references are considered unavailable even though the data is not yet committed to the physical addresses; and
- informing the host of the determined available capacity of the memory;

means for performing other, non-atomic operations requested by the host in the memory in parallel with the plurality of atomic operations, wherein the other, non-atomic operations are selected by the host so as to not exceed the determined available capacity of the memory; and means for, in response to determining that an atomic operation of the plurality of atomic operations failed or was aborted by the host:
- deleting the partial commit reference in the entry in the logical-to-physical address map for the physical address associated with the atomic operation; and
- determining an updated available capacity of the memory, wherein the physical address associated with the atomic operation is considered available after the partial commit reference in the entry in the logical-to-physical address map for the physical address is deleted.

19. The data storage device of claim 1, wherein the controller is further configured to respond to a request from the host for a status check of the plurality of atomic operations.

20. The method of claim 10, wherein the memory comprises a three-dimensional memory.

* * * * *